United States Patent [19]

Burke et al.

[11] Patent Number: 5,613,154

[45] Date of Patent: Mar. 18, 1997

[54] SYSTEM AND METHOD FOR MANAGEMENT OF TRANSIENT DATA STORAGE MEDIUMS IN AN AUTOMATED DATA STORAGE LIBRARY

[75] Inventors: William T. Burke; Timothy A. Griffin; Jonathan W. Peake, all of Tucson, Ariz.

[73] Assignee: International Business Machines Corporation, Armonk, N.Y.

[21] Appl. No.: 360,106

[22] Filed: Dec. 20, 1994

[51] Int. Cl.⁶ .......................... G06F 13/00; G11B 17/22
[52] U.S. Cl. .......................... 395/821; 395/833; 369/30; 369/34; 369/37; 360/69; 360/99.06
[58] Field of Search .................. 395/821, 823, 395/828, 833; 369/30, 34, 36, 37, 38; 360/69, 91, 92, 98.01, 99.06

[56] References Cited

U.S. PATENT DOCUMENTS

| | | | |
|---|---|---|---|
| 4,504,936 | 3/1985 | Faber et al. | 369/34 |
| 4,675,856 | 6/1987 | Rudy et al. | 369/36 |
| 4,779,151 | 10/1988 | Lind et al. | 360/92 |
| 4,817,070 | 10/1989 | Hug et al. | 369/36 |
| 4,878,137 | 10/1989 | Yamashita et al. | 360/98.05 |
| 4,879,615 | 11/1989 | Teranishi et al. | 369/34 |
| 4,984,106 | 1/1991 | Herger et al. | 360/92 |
| 4,987,533 | 1/1991 | Clark et al. | 364/200 |
| 5,022,019 | 6/1991 | Motoyoshi et al. | 369/36 |
| 5,033,038 | 7/1991 | Kobayashi et al. | 369/36 |
| 5,056,073 | 10/1991 | Fitzgerald et al. | 369/36 |
| 5,065,379 | 11/1991 | Smith et al. | 369/36 |
| 5,121,483 | 6/1992 | Monahan et al. | 395/275 |
| 5,123,000 | 6/1992 | Fitzgerald et al. | 369/36 |
| 5,197,055 | 5/1993 | Hartung et al. | 369/34 |
| 5,418,763 | 5/1995 | Ichikawa et al. | 369/30 |
| 5,546,315 | 8/1996 | Kleinschnitz | 364/478.06 |

*Primary Examiner*—Jack B. Harvey
*Assistant Examiner*—Jeffrey K. Seto
*Attorney, Agent, or Firm*—Baker, Maxham, Jester & Meador

[57] ABSTRACT

A system and method for processing data storage mediums (DSMs) that are not stored in an automated data storage library on medium drive devices that are part of the library. An input station used to add DSMs is enabled to serve as an input and output window for transient data storage mediums (TDSMs) so that DSMs are not dislodged from the storage bins. An operator may automatically place the library's robotic picker in a "TDSM mount mode" when an attached host processor requests one or more data volumes stored on one or more TDSMs. A library-manager controller can be automatically configured to interact with the library's robotic pickers to transfer a TDSM from the input/output station to a device, such as a tape drive within the library. The library manager controller is automatically configured to ignore the machine readable external label of a TDSM so that it is not necessary to place such a label on a TDSM. The controller can notify the operator when processing of the data volume is complete and return the TDSM to the input/output station for ejection from the library. By employing this system and method existing hardware of an automated library system is employed to achieve processing of TDSMs without the need for a drive device outside of the library to process the TDSM data volumes.

43 Claims, 12 Drawing Sheets

SYSTEM AND METHOD FOR MANAGEMENT OF TRANSIENT DATA STORAGE MEDIUMS IN AN AUTOMATED DATA STORAGE LIBRARY

BACKGROUND OF THE INVENTION

1. Field of the Invention

This invention relates generally to a machine executed method and a system for managing one or more data volumes stored outside of an automated storage data library. More particularly, the method and system allow for an efficient handling of transient data storage mediums containing such data volumes that are requested for data processing without displacing data storage mediums stored in the library.

2. Description of the Related Art

Modern computer systems require large quantities of storage capacity. To meet this requirement computer memory is available in many forms. A fast, but expensive, form of memory is main memory, typically in the form of micro chips. Other available forms of memory, known as peripheral memory, include magnetic direct access storage devices (DASD), magnetic tape storage devices, and optical recording devices. Each of these other types of memory has a greater storage density and lower cost than main memory. However, these other memory types require mechanical movement to access stored data and therefore exhibit slower access times than purely electronic main memory.

Storing all data in a computer system in main memory is too costly; but, storing all data on one peripheral storage device reduces performance. Thus, a typical computer system includes both main memory and one or more types of peripheral memory arranged in a data storage hierarchy. In such a hierarchy, main memory is often referred to as the primary data storage. The next level of a hierarchy is known as the secondary data storage, and so on. Generally, the highest level of the hierarchy has the lowest storage density capability, the highest performance, and highest cost. As one proceeds down through the hierarchy, storage density generally increases, performance generally decreases, and associated costs generally also decrease. By transferring data between different levels of the hierarchy, as required, the cost of memory is minimized and performance is maximized. Data is thus stored in main memory only so long as it expected to be required by the processor.

Therefore, in order to have the required information available on an "as needed" basis, much storage at the lowest level of the hierarchy is required. Many business applications, for example, require numerous disks or tapes to meet the lowest level storage needs. Automated storage libraries have been developed to manage the storage of and provide efficient access to such disks or tapes. Automated storage libraries include a plurality of storage bins or slots for retaining data storage media, such as magnetic tapes, magnetic disks, or optical disks, and also have a robotic picker mechanism, and one or more drives. Each data storage medium (DSM) may be contained in a cassette or cartridge housing for easier handling by the picker.

Referring to FIG. 1, a machine readable label to be placed on a DSM is shown. When a DSM is added to the library through an input window, the machine readable bar code label is typically scanned by a laser optical system to discern the bar code data. In this way, a catalog entry may be made based on the bar code data. This bar code data typically contains a volume serial number (VOLSER) in machine readable form as shown by bars 15a. It is well known to use varying widths of bars to designate different information and the use of such bar codes is quite common. It is the VOLSER which is used by the host system to request data residing on a particular DSM. Typically, the label also contains human readable information 15b so that an operator may also identify a particular DSM. Once the process has been initiated to add a DSM to the library, the picker may be automatically commanded to move the DSM to a storage bin. Further, the picker operates on command to transfer the storage media between the storage bins and the drives without manual assistance.

Once a data storage medium is mounted in a drive, data may be written to or read out from that medium for as long as the system so requires. The data stored on the medium is referred to as a "data volume" or simply a "volume". It is conventional in the art to refer to the medium as simply a "volume", once it has data written on it, and this convention is adopted here. In an automated data storage library, the normal operation is to automatically move a data storage medium (DSM) from an internal storage bin, mount it on a medium drive, perform a host requested read/write operation, demount the medium from the drive, and return the medium to the storage bin. The medium remains in the bin until requested again. However, automation hardware is very expensive and space in the library is usually very limited. Therefore, it is common to provide a storage shelf outside of the library for storing DSMs which are not frequently used. Occasionally, these less frequently requested mediums are needed for such operations as updates to the data stored on the medium. In this case, the typical user must mount these mediums on drives outside of the library or insert the medium into the library. DSMs which are placed into an automatic storage library on such a temporary basis are known as "transient data storage mediums" (TDSMs). If a TDSM is placed into a storage bin in an automatic library, it will probably be necessary to remove more frequently used cartridges until the transient mediums have been adequately serviced by the host requested read/write operation.

It is desirable to treat TDSMs differently than DSMs so that they are automatically recognized as not belonging to the library so that precious resources in the library are not allocated to TDSMs except on a temporary basis. Accordingly, it would be helpful to not require machine readable labels for TDSMs so that they are not automatically added to a library cataloging system. Also, the labor burden of adding such a label to a TDSM would be circumvented. However, it would also be desirable to ignore such a label if one is encountered on a TDSM to avoid creating superfluous data. Further, a request from a host to process data residing on more than one TDSM should be efficiently handled without the requirement for machine readable labels being read.

Several automated storage libraries are known. IBM Corporation introduced the 3850 mass storage subsystem for retrieval of magnetic tape modules in the 1970s. More recently, several automated storage libraries for magnetic tape cartridges and optical disks have been introduced. Examples of an automated storage and retrieval system, employing an automated tape cartridge library can be found in U.S. Pat. Nos. 4,864,511 and 4,864,438. Examples of optical disk libraries can be found in U.S. Pat. Nos. 4,974, 156 and 4,945,428. Also systems for general automated libraries capable of handling either tapes or optical disks are described in U.S. Pat. Nos. 5,121,483 and 5,197,055. The robotic picker mechanisms of these libraries include one or more grippers. Each gripper is capable of handling one data storage medium at a time.

U.S. Pat. No. 4,864,438 describes an apparatus for managing movement of tape cartridges in an automated tape cartridge library system. In the apparatus, each tape cartridge stored in the library system is identified and its physical location is determined, whether in its home position or in transit. The apparatus includes a path selection apparatus to manage the movement of the tape cartridges between home (storage) positions and mounting positions in designated drives. In this regard, a path between two end points is selected, and the apparatus is reserved to transport the designated tape cartridges between these two end points. Provision is made for maintaining the apparatus reservations until the movement of the tape cartridge is completed. In this fashion, if the movement of the tape cartridge is blocked somewhere along the path, the apparatus remains reserved to return the designated cartridge back to its original or home position. However, this patent does not disclose a solution to the problem of handling TDSMs without requiring the displacement of mediums stored in the library.

Several U.S. Patents disclose techniques useful in an automated library or automated storage system for efficiently handling volumes of data within the library or system, but none address the problem of efficiently handling TDSMs. For example, U.S. Pat. No. 5,197,055 discloses the preemptive demounting of a data volume from a device, such as a tape drive, when the volume has not been accessed by the host in a predetermined period of time and the device has been requested for use by the host. For another example, U.S. Pat. No. 5,121,483 discloses a method of temporarily demounting an optical diskette from a drive so that the drive can be used by another mount request while maintaining an appearance to the host that the demounted volume is still mounted. In yet another example, a method for ejecting cartridges from an automated optical storage library according to the results of employing a well known "least frequently used" algorithm is disclosed in U.S. Pat. No. 4,987,533.

SUMMARY OF THE INVENTION

It is an objective of the present invention to provide a system and method for enabling the use of a device that is part of an automated data storage library for handling mounts of transient data storage mediums without having to displace frequently used data storage mediums from storage bins in the library.

It is another objective of the present invention to eliminate the need for devices, such as tape or disk drives outside of an automated library in order to process host requests to read or write data stored on data storage mediums stored outside of the automated library.

It is still another objective of the present invention to eliminate time delays for an operator to perform a mount operation of a transient data storage medium.

It is one other objective of the present invention to eliminate the need for a machine readable external volume label on a transient data storage medium.

It is still another objective of the present invention to handle sequential mounting of multiple transient data storage mediums according to the need for them as specified by a host request.

It is yet another objective to eliminate the need for allocating storage bins inside of an automated storage library for the use of transient data storage mediums.

It is yet one more objective to allow a transient data storage medium mount and demount function to be added without requiring expensive reprogramming of the host.

In accordance with this objectives, a method and system for servicing a host processor request to process one or more data volumes stored on one or more respective requested unmounted transient data storage mediums (TDSMs) in an automated storage library is disclosed. The present invention takes particular advantage of an input station which is included as part of a typical automated storage library, and which is used for adding one or more data storage mediums (DSMs) to the library. The present invention employs a system and method that determines if the one or more requested unmounted TDSMs are positioned at the input station for being transferred by the library's robotic picker to an input drive. In response to determining if the one or more requested unmounted TDSMs are positioned at the input station, the system commands the robotic picker to transfer a TDSM selected from the one or more TDSMs at the input station to a selected medium drive. The TDSM is then mounted on the selected medium drive and a signal is sent to an operator display to indicate that the mounting of the TDSM on the selected medium drive is completed. The system then allows the host to process the data volume stored on the medium, and then the robotic picker is commanded to transfer the TDSM from the selected medium drive to the input station.

The objects and advantages of the present invention may be best understood with reference to the drawing and the detailed description below.

DETAILED DESCRIPTION OF THE PREFERRED EMBODIMENTS

Figure 1:
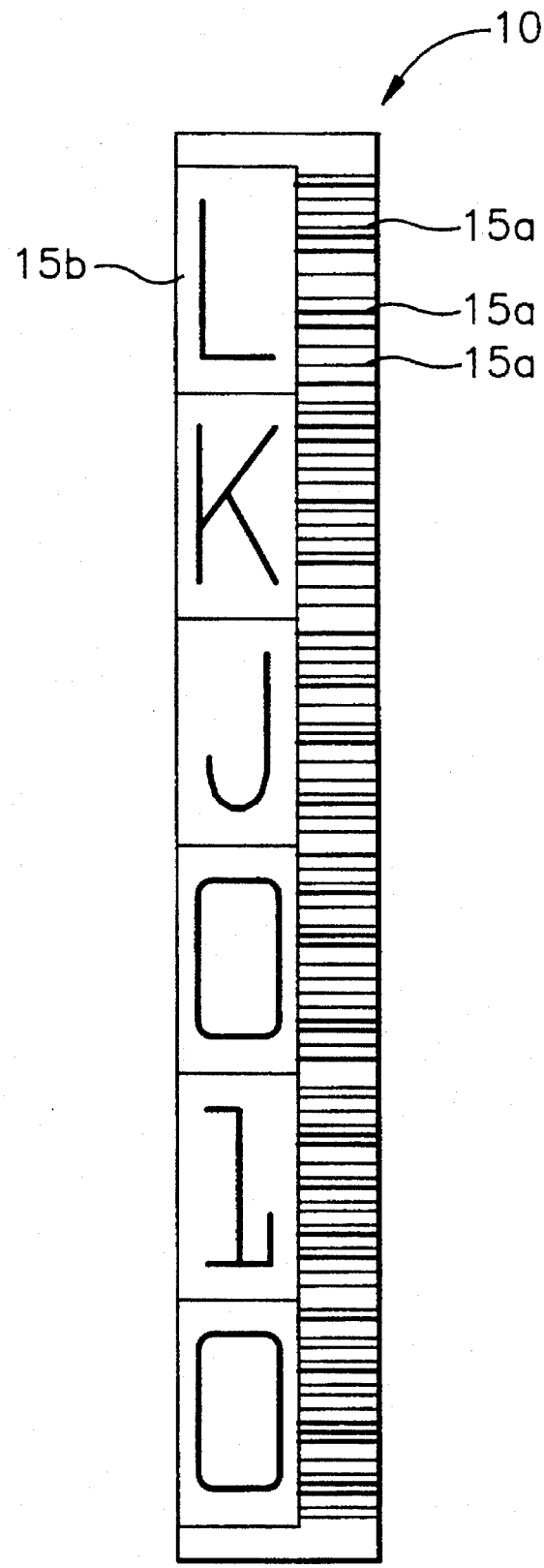
FIG. 1 is a conventional machine readable label used with prior art library management.
Figure 2:
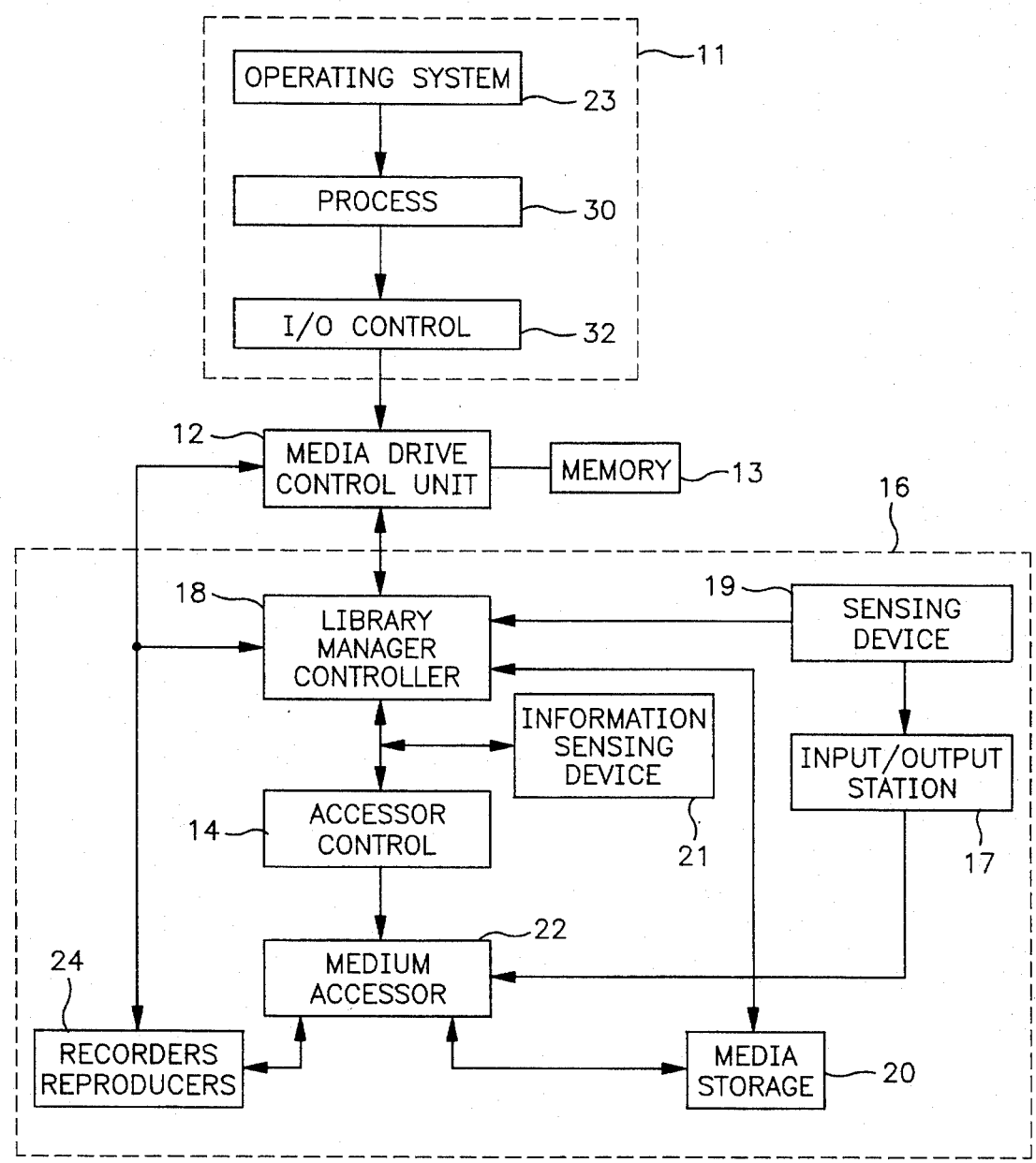
FIG. 2 is a block diagram showing the architecture of the present invention.

Referring to FIG. 2, a simplified overview of a system architecture useful for implementing the present invention is shown. Host processor 11 includes an operating system 23 for managing host application programs and interfacing with input/output (I/O) devices through I/O control 32. The host in a preferred embodiment may be either a large mainframe such as the IBM ES9000 or a midrange computer such as the IBM AS/400. If the host is an IBM ES9000 then a preferred operating system is either the Multiple Virtual Storage (MVS) program, or the Virtual Storage Extended (VSE) program. The host processor 11 includes logic for computation and data processing system control. Such logic may include a program which provides for migration and backup of data storage from a primary level of peripheral devices to a secondary level. The secondary level includes the media storage units 20 shown in FIG. 2. The I/O control 32 controls the interface between the media library 16 for the retrieval of the data from media units stored in the media storage units 20. The I/O control 32 may be processed through a separate medium device control unit 12, which may be, for example, an IBM 3490 tape drive control unit, or the I/O control may be performed ayschronously, such as via an RS232 interface in an IBM AS/400 environment. Another envisioned embodiment of the I/O control is over a local area network through a network adapter electronic card, such as a token ring adapter card or an ethernet adapter card.

The host processor 11 includes a program task which receives software commands from other programs in the host processor 11. Such commands are decoded and transferred to a control task program within the host 11. The control task program includes the logic for determining when data is to be retrieved from the media library 16. The programs for enabling command and control tasks may be part of operating system 23, or may interact with the operating system in a manner well-known in the art. The data to be retrieved is processed in a process module 30 and directed out to an I/O control module 32 to the control unit 12. The control unit 12, in turn, passes the request to the media library 16. The library manager 18 of the library 16 uses the request to determine the control of media and the cartridge accessor 22, according to the present invention.

Storage of data in media units 20 is provided in at least one automated storage "library" 16, which is adapted to receive removable media. The library 16 is one that uses sequentially recorded data on transportable media, which may include magnetic tapes, magnetic disks, and optical disks. The library 16 may be an automated library of known design. Such a library, in one embodiment of the present invention, includes the IBM 3495 Tape Library Dataserver which has tape cartridges mountable on recorders/reproducers for providing data communication between the volumes of data stored in each cartridge and the control units 12. The media library system may also be an optical disk library as discussed above. Alternatively, in another embodiment, a Tape Library Dataserver which is useful for implementing the present invention is the IBM 3494 is much smaller than the IBM 3495, but serves a similar function.

A "library manager controller" 18 includes a processor containing program code for controlling the retrieval of data in the library 16. The library manager 18 manages the operation of one or more media storage units 20, the accessing of medium by one or more medium accessor units 22, and the reading and writing onto the media in one or more recorder/reproducer units 24, all included as part of the library 16. The control of the library 16 is provided by the library manager controller 18. Accessing of mediums is managed by interfacing with accessor control logic 14. Library manager controller 18 communicates with a sensing device 19 which is sensitive to whether there are mediums placed in input/output station 17. The sensing device 19 is also sensitive to whether an access port for mediums is available in input/output station 17 for accessing by medium accessor 22. The sensing device 19 may be any well-known type of electronic, optical, mechanical, or combination device capable of sensing the position of an object.

Another sensing device 21 coupled with the robotic picker is used for the purpose of reading machine readable labels on DSMs, such as label 10. Such a device is known in the art and may include robotic cameras coupled with optical character recognition software or may be a well known laser scanning device. Hereafter, in this document, like numbers followed by alphabetic letters are used to represent particular embodiments of the generically described invention. For example, library manager controller 18 is represented below as library manager controller 18a in one embodiment and library manager controller 18b in one other embodiment.

One Embodiment of the Present Invention

Figure 3:
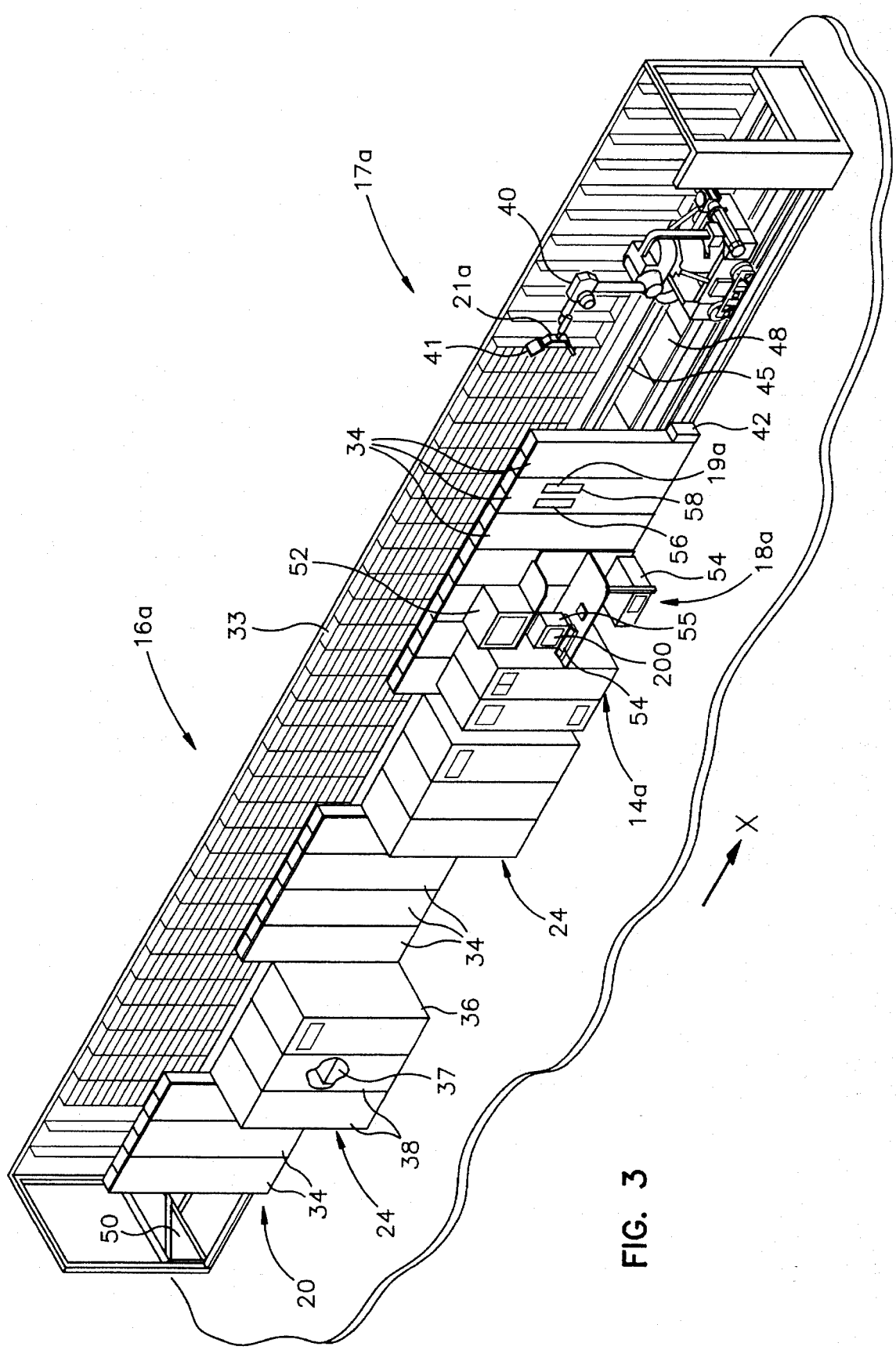
FIG. 3 illustrates a storage library embodiment useful with the present invention.

Referring to FIGS. 2 and 3, in one embodiment the general library manager controller 18 is embodied as library manager controller 18a which is an IBM PS/2 personal computer 54 running OS/2 with special application program code loaded in well-known random access memory. The computer 54 has a display 55 having a screen 200 for presenting information to an operator. Preferably, the mediums are stored in cartridges for ease of handling in a manner well-known in the art. Thus the medium accessor unit is preferably a cartridge accessor unit. The library manager 18 is generally responsible for the duties of controlling the one or more cartridge accessor units 22, providing service interfaces, and communicating with the host operating system 23.

FIG. 3 shows an automated form of a cartridge library 16a which represents one embodiment of the library 16 of FIG. 2. It should be evident that many different types of media may be stored in the library 16, such as spiral recorded optical disks and magnetic disks, as well as magnetic tapes stored in any type of casing, such as cassettes or cartridges. In the embodiment, as shown in FIG. 3, individual spools of magnetic tape are housed in plastic cartridges for protecting the magnetic tape and providing a convenient handling mechanism for the automated retrieval of the cartridges. Such plastic cartridges are well known in the art.

Referring once more to FIGS. 2 and 3, automated storage libraries, such as library 16a, improve the access time to the information stored on the media units contained therein by automatically managing the storage of the data onto the media units through the library manager 18a. The library 16a includes a plurality of storage bins 33 (shown in FIG. 3) placed in the media storage unit 20 for storing the resident storage medium. The library 16a further includes the cartridge access units 22, each including a robotic picker mechanism ("robot") 40. Each robot 40 is controlled by the library manager 18 to retrieve and to store the media units from media storage unit 20. Each storage bin 33 may store a tape or disk media contained in a casing, such as a cassette or cartridge housed for easy handling by the robot. A robot 40 operates on command to transfer a data storage media unit between the media storage unit 20 and the recorders/reproducers 24.

Referring to FIG. 3, the library 16a includes the media storage unit 20, shown as a plurality of modules 34 each having a plurality of magazine holders (not shown). Each magazine holder in a module 34 includes a plurality of storage bins 33, each storage bin 33 for storing a magnetic tape cartridge therein. The library 16a also includes one or more recorder/reproducer units 24, each of which may be, for example, an IBM 3490 magnetic tape system having a tape controller 36 and a tape subsystem 38 containing at least one tape drive 37. An example of a tape drive usable as the tape drive of the tape subsystem 38 is shown in U.S. Pat. No. 4,399,936, issued on Mar. 6, 1984, assigned to the assignee of the present invention and herein incorporated by reference. Operation of the controller 36 and the tape drive are discussed in U.S. Pat. No. 4,435,762, issued on Aug. 23, 1983, and assigned to the assignee of the present invention and herein incorporated by reference.

In the library 16a of FIG. 3, each cartridge accessor 22 of FIG. 2 includes the robot 40, having a swivel capable gripper assembly 41 attached thereto, which travels on an outrigger rail 42 and a guide rail 45 in direction x to transfer tape cartridges between the storage bins 33 and the tape drive 37. A robot controller program (in accessor control 14a in FIG. 3) and the Library Manager Program (in computer 54 in FIG. 2) control the commands directed to the robot 40 and the operation of the recorders/reproducers 24. An information sensing device 21a is used to read machine readable external labels which are affixed to DSMs. In this embodiment, as shown in FIG. 2, it is preferable to use a well known video camera for recording an image of the label coupled with digitizing and Optical Character Recognition software, such software may be obtained from Cognex Corporation and may be obtained in an integrated housing with circuitry for implementing the software in the Cognex model VB1. Such a model may be housed separate from the robotic mechanism due to its size and weight without departing from the spirit of the invention. A service bay 48 for the robot 40 is located at one end of the cartridge library 16a. The service bay 48 functions as a parking space for the robot 40 when not in use or when it is being serviced. An operator access bay 50 is provided at the other end of the cartridge library 16a to allow service personnel to enter the system. A remote terminal bay 52, accessible internally by the service personnel, is attached to the cartridge library 16a.

Library management and control of the library manager 18a of FIG. 3 are available to an operator through computer 54. The library manager 18a, through the computer 54, permits an operator to determine system status, promote a tape cartridge status and generally enter external instructions into the cartridge library system 16. The library manager 18a instructs the robot 40 to identify the tape cartridges and to move them to a tape drive 37 for either writing data information onto tape or retrieving the data already stored on tape under control of the library manager 18a. The library 16a includes the media storage unit 20, the modules 34 and the storage bins 33, the cartridge accessors 22, the robot 40, the recorders/reproducers 24, the tape controller 36, and the tape subsystem 38.

Figure 4:
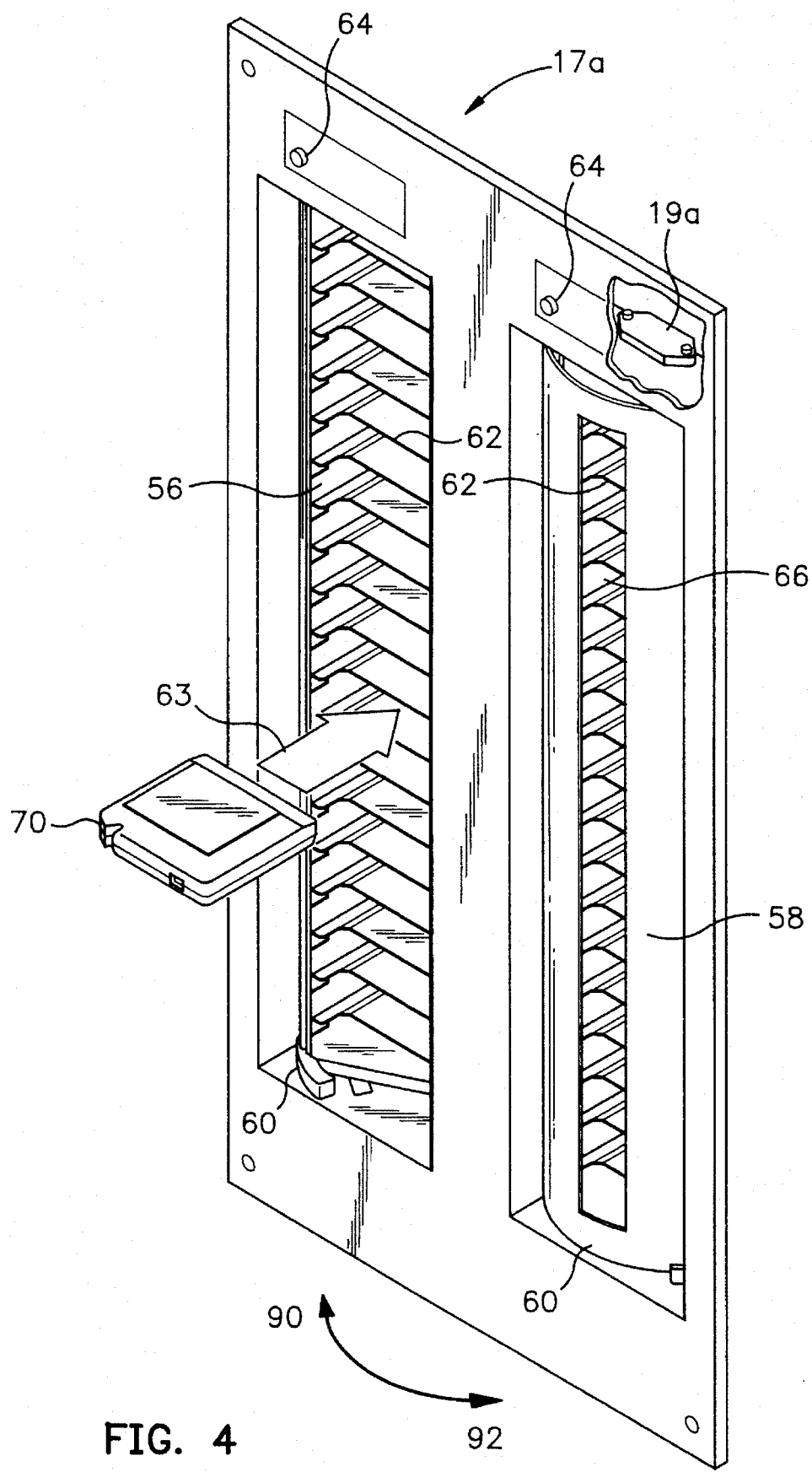
FIG. 4 shows an arrangement of an input station useful with the storage library of FIG. 3.

Referring to FIGS. 2-4, an input/output station 17a is one embodiment of input/output station 17. In one embodiment the input/output station 17a is comprised of input window 56 and output window 58. The input window 56 is used by an operator to place transient data storage mediums (TDSMs) into library 16a. By using the input window 56, an operator can satisfy a host request to process data stored on a cartridge 70 that is not part of library 16a. The operator places the transient cartridge 70 in a slot 62 in the direction 63. A door 60 on the input/output station is open, that is rotated in direction 90 when the window 56 is available for input. An identical door 60 on the output window 58 operates in the same manner. Indicators 64 show if either door 60 is open or closed. The cartridge accessor 22 can be commanded by the library manager controller to transport the medium to a drive in tape subsystem 38 where it is processed. The accessor can then be commanded to return the medium to output window 58 of input/output station 17a for removal by an operator. Door 60 must be closed in order for the accessor 22 to access the cartridge 70. The sensing device 19a indicates the presence of cartridges in either window 56 or 58 and the rotation position of doors 60. A closed position for either of doors 60 is indicated on the respective indicator 64 when either door is rotated in direction 92. Of course, the rotation directions shown could be chosen to be different from that illustrated without deviating from the spirit of the invention. Although an input/output station is known for use in automated libraries, it is heretofore unknown to implement such stations to facilitate the processing of data stored on mediums which are not part of the library and are not to be added to the library.

Second Embodiment

Figure 5:
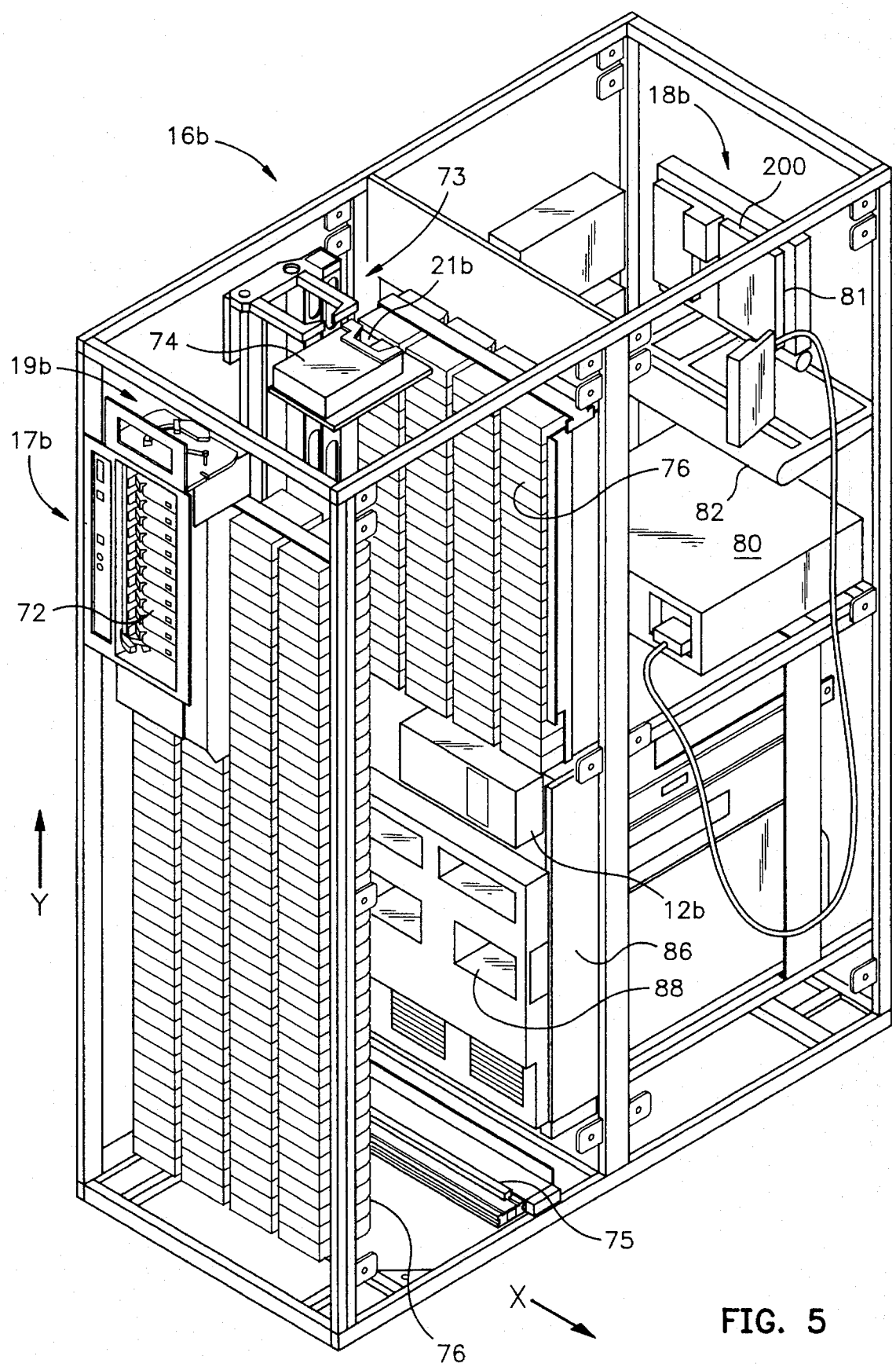
FIG. 5 illustrates another storage library embodiment useful with the present invention.

Referring to FIGS. 2 and 5, one other embodiment of the present invention is shown. The library 16b may be an automated library of known design. Such a library in the second embodiment of the present invention preferably includes the IBM 3494 tape library data server which has tape cartridges mountable on recorders/reproducers for providing data communication between the volumes of data stored in each cartridge and the control units 12b. The media library system may also be an optical disk library as discussed above. The library manager controller 18 is embodied by a library manager controller 18b that is an IBM personal computer 80 running OS/2 with special application program code loaded in well-known random access memory. The computer 80 has attached a keyboard 82 for operator input and a display 81. The display has an identical screen 200, as in the first embodiment, for presenting information to an operator. The mediums on which data volumes are stored are preferably cartridges, as in the first described embodiment.

The library manager controller has identical tasks as in the first described embodiment, and is generally responsible for the duties of controlling the one or more cartridge accessor units 73, providing service interfaces, and communicating with the host operating system 23. In this embodiment, the accessor controller 14 is housed in computer 80 in the form of one or more adapter cards (not shown). As with the first described embodiment, library manager controller 18b communicates with the sensing device 19b which is sensitive to whether there are cartridges placed in input/output station 17b. Also controller 18b communicates with information sensing device 21b used for reading external labels on DSMs. In this embodiment, due to size and cost restraints it is preferred that the device 21b, be implemented as a well known laser bar code scanning device. Such a device may be obtained, for example, from Microscan Corporation. Input/output station 17b is an embodiment of input/output station 17. Input/output station 17b has one dual mode input/output window 72. Cartridge accessor unit 73 is comprised of a swivel capable gripper unit 74 and a well-known lead screw type of transport assembly 76. Transport assembly 76 allows the gripper to move in an up-down fashion along a Y axis. A rail 75 allows the unit 73 to move along a shown X axis. Movement is initiated by well-known motors (not shown). Under library manager controller 18b command the accessor 73 moves gripper 74 in place to retrieve cartridges from input/output window 72 and place them in a respective storage bin 79. However, according to the present invention, if the cartridge is identified by an operation as a TDSM then it is placed directly in tape subsystem 86 for processing in tape drive 88. Tape subsystem 86 and tape drive 88 are of known design such as the IBM 3490 model C2A product.

Figure 6:
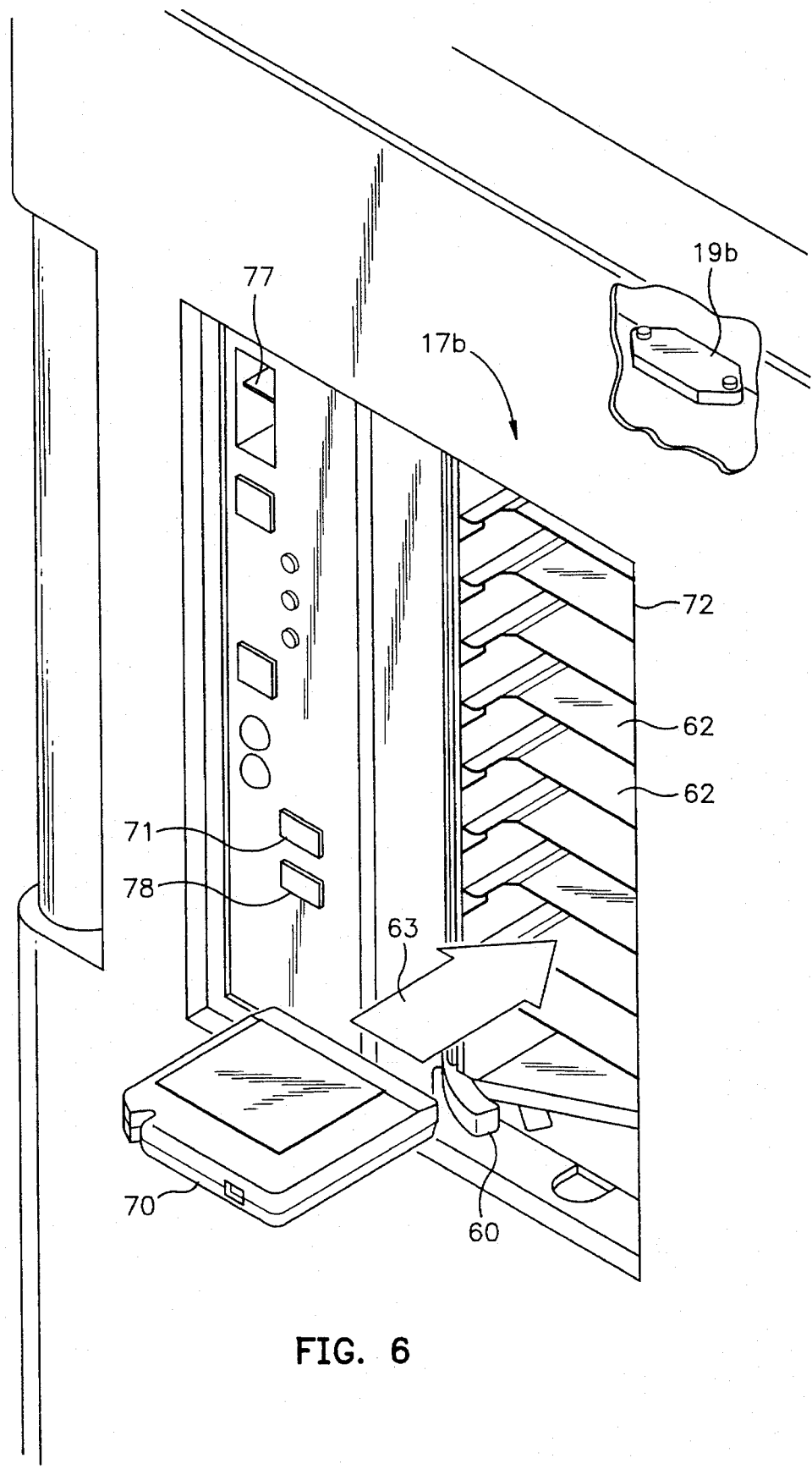
FIG. 6 illustrates an arrangement of the input station useful with the storage library of FIG. 5.

Referring to FIG. 6, the input/output station 17B is shown. As described above, the input/output station of this embodiment serves a dual function, such that the window 72 may be used for placing TDSMs into library 16B and for retrieving the TDSMs from the library as well. Thus, cartridge 70 may be placed by an operator in slot 62 in direction 63 as shown when the door 60 is rotated into an open position. Status indicator 71 will indicate that the station is in input mode. Conversely, status indicator 78 will indicate that the station is in output mode. Other operator control buttons and switches, such as power switch 77, are also present but are not critical to the present invention and therefore are not mentioned.

Input Station Overview

Figure 7:
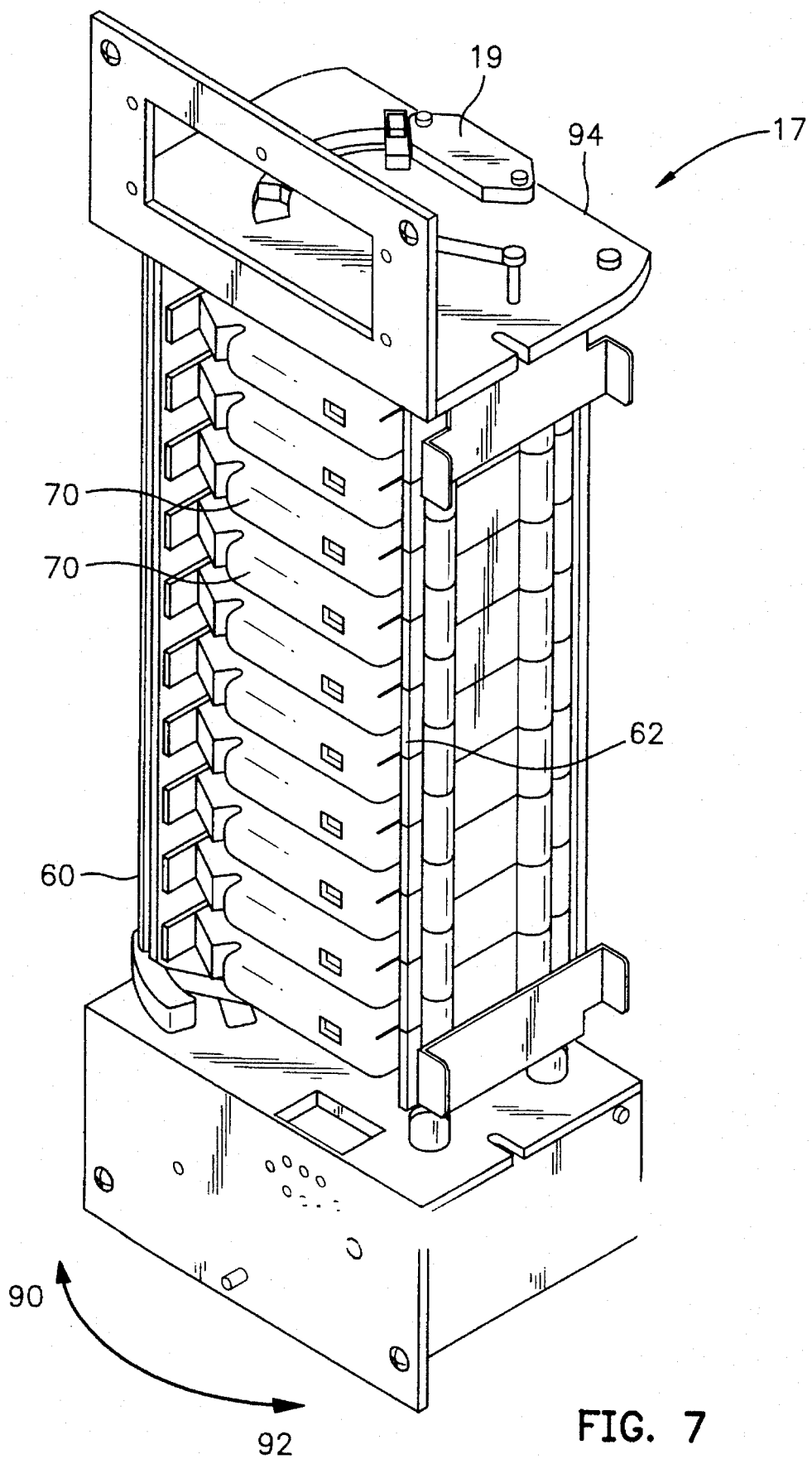
FIG. 7 shows the input station of FIGS. 4 and 6 in an open position.
Figure 8:
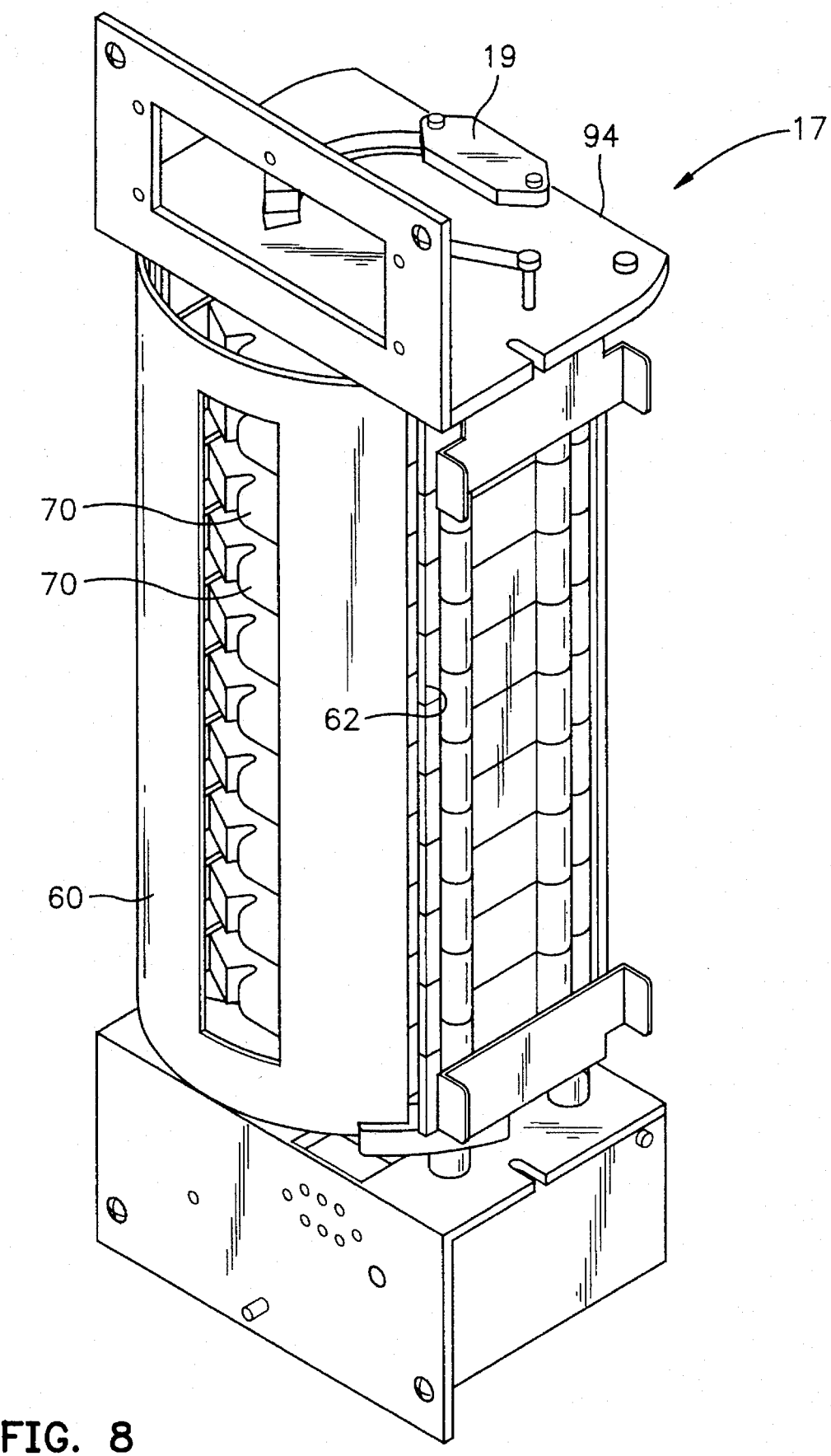
FIG. 8 shows the input station of FIG. 7 in a closed position.

Referring to FIGS. 7 and 8, a more detailed description of the input station which is identical in configuration for either embodiment is shown. The door 60 is shown rotated in the open direction 90 in FIG. 7. Each cartridge 70 is available to an operator and may be removed manually, but is unavailable to a cartridge accessor because the door 60 blocks robotic access from the side of the input/output station available to the robotic picker. Alternatively, in FIG. 8, cartridges 70 are available to the picker because the door 60 is rotated in direction 92 and is therefore closed from the operator side. It should be noted that in FIG. 7 a portion of the door can be seen at position 94 as blocking the picker, while in FIG. 8 it can be seen at position 94 that there is no blockage because all parts of the door are now in the operator side of the input/output station 17. The sensing device 19 which senses the position of the door and whether or not cartridges 70 are in slot 62 may be any type of position sensors well-known in the art. Such sensors may be light sensitive sensors or some type of mechanically-actuated sensors. The type of sensor used is not critical to the present invention as long as one or more sensors is capable of recognizing when the door 60 is open and closed and whether or not there are cartridges 70 in slot 62.

For the purpose of clarification, it may now be helpful to review the previously discussed embodiments of the invention. In the first discussed embodiment, there is a separate input and output window. In the second embodiment one station has two windows which are used alternatively for input and output of cartridges. Preferably, the input/output station 17 is substantially identical for either embodiment with the exception of the shared function design in the second embodiment to save physical space. The use of an input/output station is known for allowing an operator to add new DSMs into an automated data storage library. The present invention uses such an input station as the source of input for TDSMs to be retrieved and mounted on a drive in the library. Once the processing of the TDSM is complete, the cartridge is returned to the station. The operator may retrieve the processed TDSM at the output window for return to outside library storage. Thus, a heretofore unknown mode of operation is defined and denominated as a "TDSM mount mode". A TDSM mount uses the input/output station as the source for TDSMs and returns each processed TDSM for ejection from the library.

There are two preferred embodiments of entering TDSM mount mode. One embodiment involves selection by an operator on an operator interface presented on a screen of a display which is part of computer 54 or 80. The computer is part of the automated data storage library 16. Another embodiment for entering TDSM mount mode is accomplished in an automatic fashion by a command issued from host 11 through an Input/Output (I/O) control module 32 issued to the library manager controller 18. In either embodiment, it is best to allow continuation of the TDSM mount mode until it is either deselected by an operator at the operator interface or by a host command which is issued to terminate the mode. As long as the TDSM mount mode continues, TDSMs can be transported to a drive, mounted, read or written at the drive, and returned from the drive without further operator or host intervention.

Method for Implementing the Invention

Figure 9:
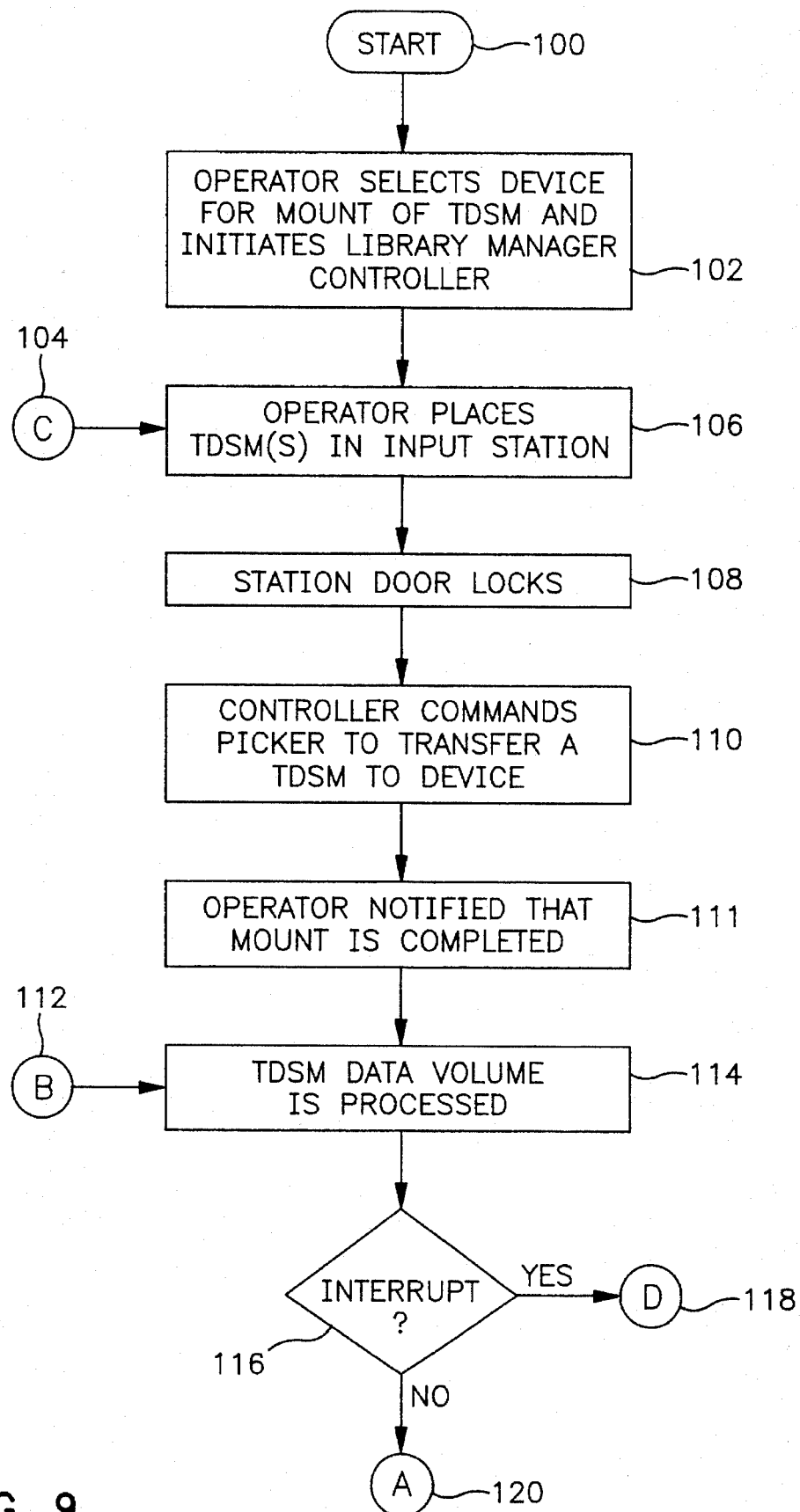
FIGS. 9–11 are flow diagrams illustrating a method of implementing the present invention.
Figure 10:
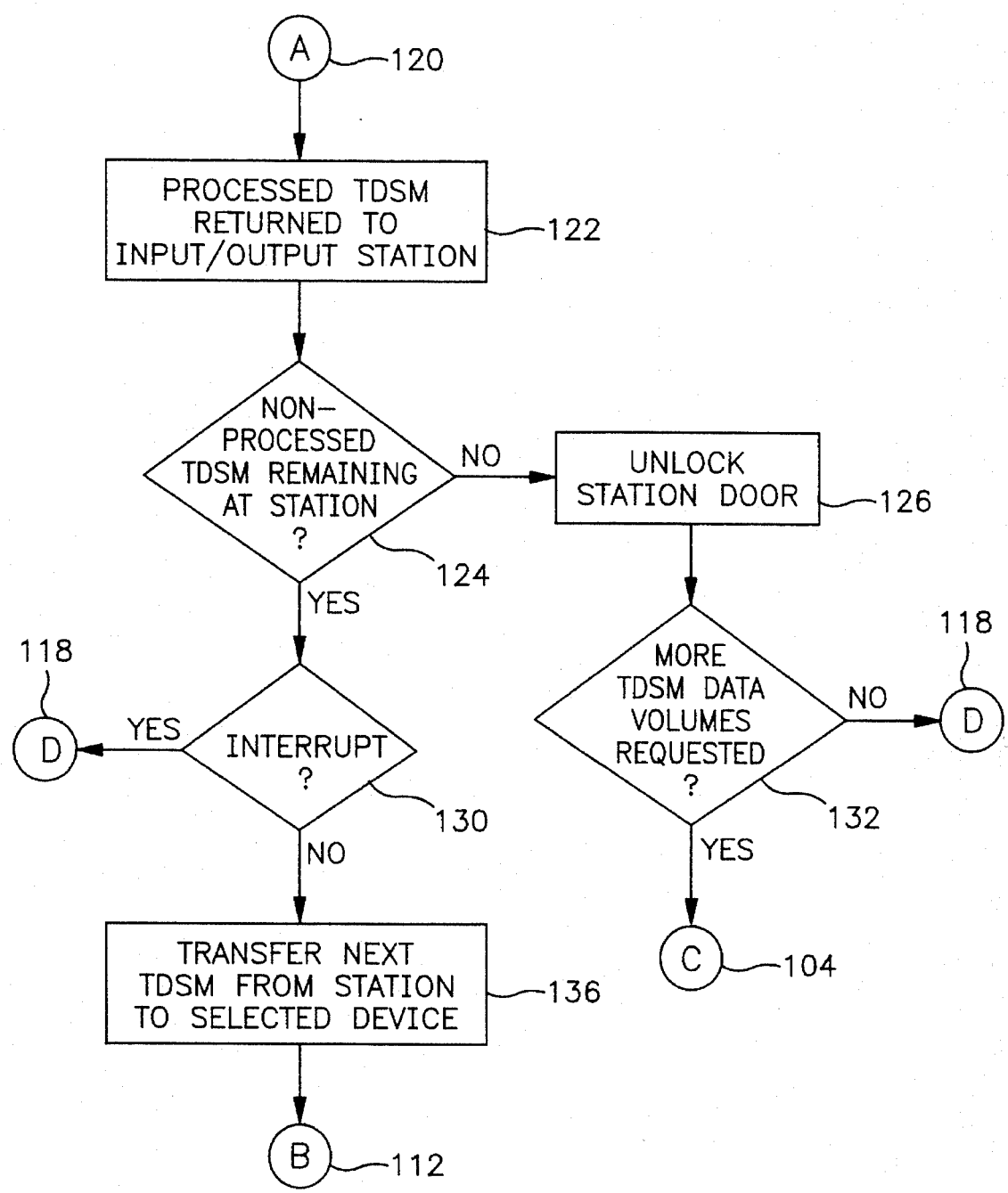
Figure 11:
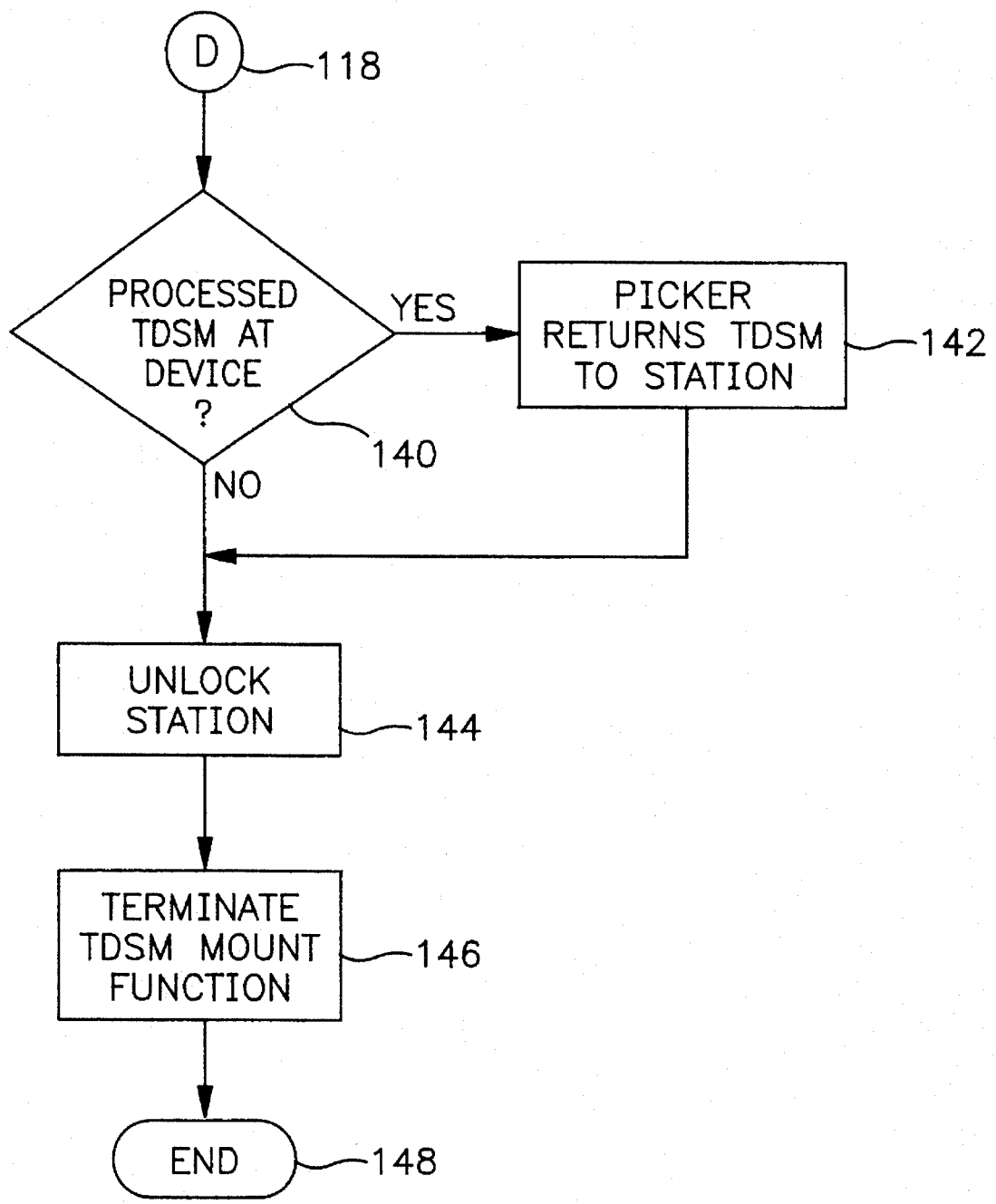
Figure 12:
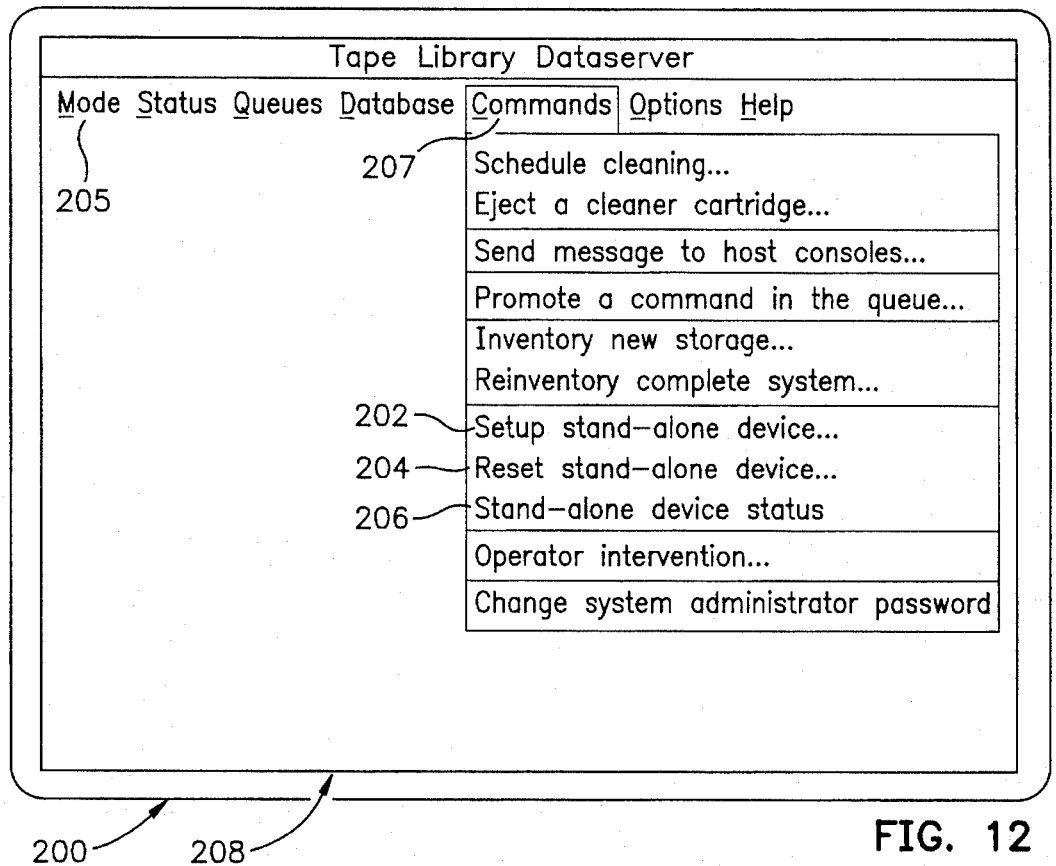
FIG. 12 is an operator interface useful with the present invention.
Figure 13:
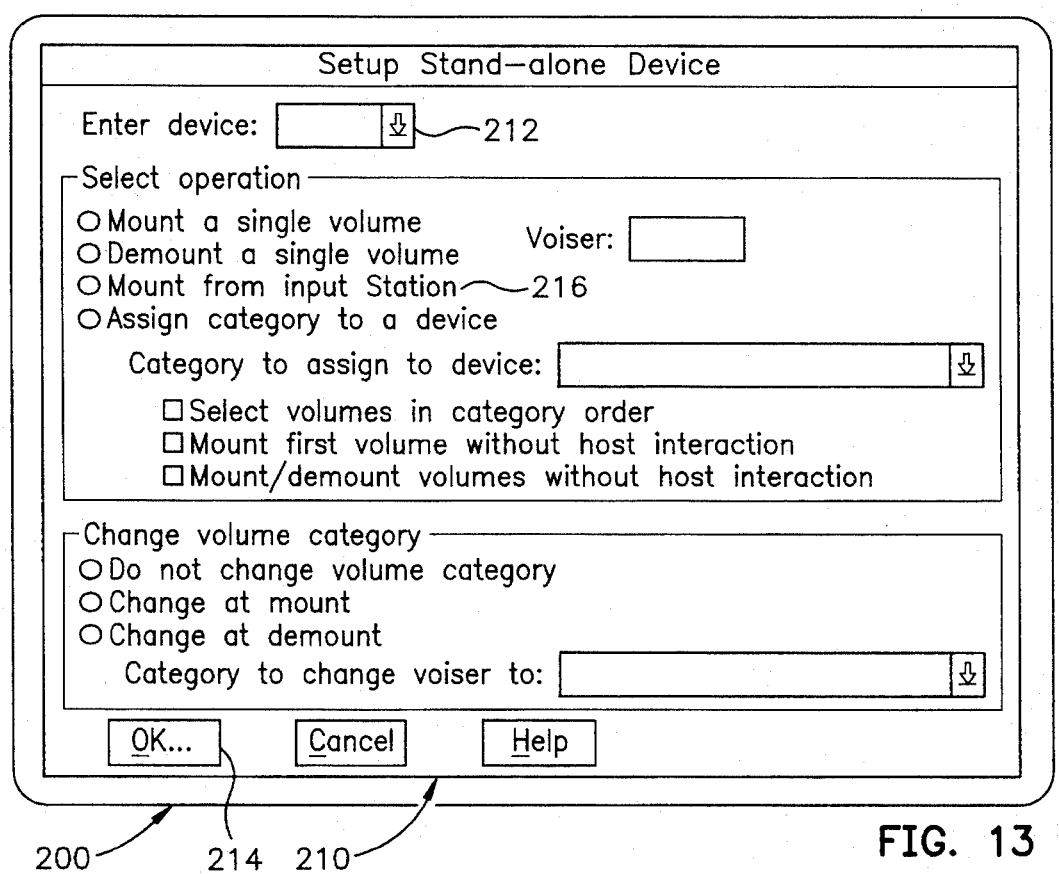
FIG. 13 is an operator interface that is related to the interface of FIG. 12.

Referring to FIGS. 9–13, a preferred method for implementing the present invention is shown. The flow chart steps shown in FIGS. 9–11 provide sufficient detail for a programmer of ordinary skill in the computer science art to create logic within library manager controller 18 to carry out the described method steps. However, such logic could alternatively be implemented in hardware. The flow chart steps are best understood by referring to sample operator interface "pop-up" windows shown in FIGS. 12 and 13. The process starts in step 100. In step 102, the operator selects the TDSM mount mode from the operator interface shown displayed as "set-up stand-alone device" entry 202 on pop-up window 208 displayed on screen 200, which is part of the display for computer 54 or 80. The operator may later use entries 204 and 206 to reset the device and check the status respectively. Other entries shown on the interface are not critical to the operation of the present invention and therefore not discussed here. Any of these entries are available after the operator selects the selection "commands" 207 from menu bar 205, in a known fashion (e.g., by using a well-known mouse to move a cursor to the desired selection). Further, as part of step 102, the library manager controller 18 returns a control panel pop-up window 210 to the operator for carrying out the TDSM mount mode. The operator selects the device address of the drive to be used, and enters this in field 212 on pop-up window 210, and specifies that TDSMs are to be mounted on the drive by selecting field 216. Machine readable external labels are typically required for cartridges used in automated libraries. They are used as a tool for managing cartridges that are stored in bins in the library. Since a TDSM will not reside in a bin in the library, machine readable external labels are not required. Thus, selecting field 216 also instructs the library to ignore any external label or the cartridge having a bar code. The operator selects "OK" entry 214 on the screen 200. In step 106, the operator places one or more TDSMs into the input station in the order that the TDSMs should be mounted on the drive. Step 104 is shown to indicate continuity with the steps shown in FIG. 10. In step 108, the library manager controller 18 issues a command to automatically lock the door 60 on the input/output station 17.

The locking of the door generates a signal from sensing device 19 that the station is ready for TDSMs to be retrieved and subsequently mounted on a drive, such as drive 88, for processing. In step 110, the library manager controller generates the appropriate command to the robotic picker to move the first cartridge from the input station to the selected drive. These commands are interleaved into a command queue with host generated commands such that the TDSM mounts are accomplished as part of normal library activity. Step 112 shows continuity with the steps of FIG. 10 in a similar fashion as step 104. In step 111, the operator is informed on screen 200 that the first mount has been completed and the operator is thereby prompted to activate a host application that has requested the TDSM data. In step 114, the data from the TDSM is uploaded to the host through the I/O control 32 and processing is complete so that the picker is commanded by the library manager controller 18 to return the TDSM to the input/output station 17. An inquiry is automatically performed in step 116 to determine if an interrupt to terminate TDSM mount mode has been generated by host 11 or by the operator. If the answer is "yes" the processing flows to step 118, which picks up in FIG. 10. If the answer to the inquiry is "no" then processing continues in normal, uninterrupted fashion to step 120. In step 122, the processed TDSM is returned by the cartridge accessor to input/output station 17. In step 124, the library manager controller 18 checks to see if any non-processed TDSMs remain at station 17. The sensing device 19 is used in conjunction with logic in the library manager controller to keep up with which cartridges in certain slots 62 have not been moved, and in this way it is known which TDSMs are processed and which remain unprocessed. If the answer to the inquiry is "yes" then another check is performed in step 130 to check for interrupts. If there are no interrupts then processing continues to step 136. In step 136, the library manager controller transfers the next unprocessed TDSM in the input/output station 17 to the selected device. In an iterative fashion, the flow logic returns to step 112 and subsequently to step 114 for repetition of the steps until the answer to the inquiry in step 124 is "no". This indicates that no non-processed TDSMs remain at station 17. In this case, as shown in step 126, the library manager controller issues a command to unlock the station door 60, thus changing the status indicators 64 on embodiment 17a, or the input/output mode indicators 71 and 78 on embodiment 17b of the input/output station 17. In inquiry step 132, if more TDSM data volumes are requested by the host 11, the operator may (following the flow of step 104 to step 106) place TDSMs in the input/output station into slots 62. If no more TDSM data volumes are requested, then processing continues to step 118. In step 140, the library manager controller 18 checks to see if a processed TDSM remains at the selected device. If one remains then the picker is commanded to return the TDSM from the device to the input/output station 17, as shown in step 142. In step 144, the station is unlocked. In step 146, the TDSM mount function is terminated by the library manager controller and the flow logic steps end, as shown in step 148.

A system, method and apparatus for handling transient data storage mediums in an automated storage library has been described. Modifications thereof and other embodiments may occur to those of ordinary skill in the art in view of these teachings. Therefore this invention is limited only by the following claims, which include all such embodiments and modifications when viewed in conjunction with the above specification and accompanying drawing.

What is claimed is:

1. A method for servicing a host processor request to process one or more data volumes stored on one or more respective requested unmounted transient data storage mediums (TDSMs) in a storage library including one or more storage bins, each bin for storing a data storage medium (DSM) therein, the DSM having an attached machine readable label containing information related to the DSM, the storage library also including one or more storage medium drives and a robotic picker for transferring a DSM between any storage bin and any medium drive, the storage library having an input station for adding one or more DSMs to the storage library, the robotic picker having an information sensing device for automatically reading the machine readable label, the storage library further having a library controller and an operator display, electronic memory coupled with the control unit, the control unit in communication with the operator display and the host processor, the method comprising the machine-executed steps of:

(a) determining if the one or more requested unmounted TDSMs are positioned at the input station for being transferred by the picker;

(b) disabling the information sensing device such that if a condition exists wherein a machine readable label is attached to the one or more requested unmounted TDSMs then the label is not automatically read;

(c) in response to determining if the one or more requested unmounted TDSMs are positioned at the input station, commanding the picker to transfer a TDSM selected from the one or more TDSMs at the input station to a selected medium drive;

(d) mounting the TDSM on the selected medium drive;

(e) sending a signal to indicate that the mounting of the TDSM on the selected medium drive is completed;

(f) processing the data volume stored on the TDSM to satisfy the host processor request; and (g) commanding the picker to transfer the TDSM from the selected medium drive to the input station.

2. The method of claim 1, wherein the signal of step 1(e) is sent to an operator display.

3. The method of claim 1, wherein the signal of step 1(e) is sent to the host processor.

4. The method of claim 1, and further comprising the steps of:

determining if there are any remaining TDSMs of the one or more requested unmounted TDSMs positioned at the input station having an unprocessed data volume; and repeating steps 1(c) through 1(f) until there are no more remaining TDSMs positioned at the input station having an unprocessed data volume, unless a signal is sent to the control unit to indicate that the request to process one or more data volumes stored on one or more respective unmounted TDSMs is interrupted.

5. The method of claim 4, wherein the signal sent to the control unit to indicate that the request to process one or more data volumes stored on one or more respective requested unmounted TDSMs is generated by the host processor.

6. The method of claim 5, wherein the signal sent to the control unit to indicate that the request to process one or more data volumes stored on one or more respective requested unmounted TDSMs is interrupted is generated by the selection of an interrupt choice field presented on the operator display.

7. The method of claim 1, wherein the step 1(a) is preceded by sending a signal to the operator display to indicate that the one or more TDSMs are to be positioned at the input station.

8. The method of claim 6, wherein the step of sending a signal to the operator display to indicate that the one or more TDSMs are to be positioned at the input station is preceded by the selection of a first displayed mode choice field on the operator display, the first displayed mode choice field indicating that the control unit will be placed in an automatic mode to command the picker to transfer and mount TDSMs.

9. The method of claim 8, wherein upon the completion of the step of processing the data volume stored on the TDSM, the operator display is presented with a signal indicating that the operator may select a second displayed mode choice field, the second displayed mode choice field designating that the automatic mode to command the picker to transfer and mount TDSMs is to be terminated.

10. The method of claim 9, and further comprising the step of commanding the automatic picker to remove any remaining TDSM from the selected medium drive and to return the remaining TDSM to the input station upon selection of the second display mode choice field designating that the automatic mode to command the picker to transfer and mount TDSMs is to be terminated.

11. The method of claim 4, wherein the step of repeating steps 1(b) through 1(f) until there are no more remaining TDSMs positioned at the input station having an unprocessed data volume is followed by the step of sending a signal to the operator display to indicate that other TDSMs may be positioned at the input station to replace the one or more requested unmounted TDSMs storing a processed data volume.

12. The method of claim 1, wherein the selected medium drive corresponds to a device address sent to the control unit.

13. The method of claim 4, wherein the step 1(a) is preceded by sending a signal to the operator display to indicate that the one or more TDSMs are to be positioned at the input station.

14. The method of claim 13, wherein the step of sending a signal to the operator display to indicate that the one or more TDSMs are to be positioned at the input station is preceded by the selection of a first displayed mode choice field on the operator display, the first displayed mode choice field indicating that the control unit will be place in an automatic mode to command the picker to transfer and mount TDSMs.

15. The method of claim 13, wherein upon the completion of the step of processing the data volume stored on the TDSM, the operator display is presented with a signal indicating that the operator may select a second displayed mode choice field, the second displayed mode choice field designating that the automatic mode to command the picker to transfer and mount TDSMs is to be terminated.

16. The method of claim 14, and further comprising the step of commanding the automatic picker to remove any remaining TDSM from the selected medium drive and to return the remaining TDSM to the input station upon selection of the second display mode choice field designating that the automatic mode to command the picker to transfer and mount TDSMs is to be terminated.

17. A method for servicing a host processor request to process one or more data volumes stored on one or more respective requested unmounted transient data storage mediums (TDSMs) in a storage library including one or more storage bins, each bin for storing a data storage medium (DSM) therein, the DSM having an attached machine readable label containing information related to the DSM, the storage library also including one or more storage medium drives and a robotic picker for transferring a DSM between any storage bin and any medium drive, the storage library having an input station for adding one or more DSMs to the storage library, the robotic picker having an information sensing device for automatically reading the machine readable label, the storage library further having a control unit and an operator display, electronic memory coupled with the control unit, the control unit in communication with the operator display and the host processor, the method comprising the machine-executed steps of:

(a) determining if the one or more requested unmounted TDSMs are positioned at the input station for being transferred by the picker;

(b) disabling the information sensing device such that if a condition exists wherein a machine readable label is attached to the one or more requested unmounted TDSMs then the label is not automatically read;

(c) in response to determining if the one or more requested unmounted TDSMs are positioned at the input station, commanding the picker to transfer a TDSM selected from the one or more TDSMs at the input station to a selected medium drive;

(d) mounting the TDSM on the selected medium drive;

(e) sending a signal to an operator display to indicate that the mounting of the TDSM on the selected medium drive is completed;

(f) processing the data volume stored on the TDSM to satisfy the host processor request;

(g) commanding the picker to transfer the TDSM from the selected medium drive to the input station;

(h) determining if there are any remaining TDSMs of the one or more requested unmounted TDSMs positioned at the input station having an unprocessed data volume;

(i) repeating steps (c) through (g) until there are no more remaining TDSMs positioned at the input station having an unprocessed data volume, unless a signal is sent to the control unit to indicate that the request to process one or more data volumes stored on one or more respective unmounted TDSMs is interrupted; and (j) sending a signal to indicate that other requested TDSMs having unprocessed data volumes may be positioned at the input station to replace the TDSMs, each having a processed data volume.

18. The method of claim 17, wherein the signal of step 16(j) is sent to the operator display.

19. The method of claim 17, wherein the signal of step 16(j) is sent to the host processor.

20. The method of claim 17, wherein the signal sent to the control unit to indicate that the request to process one or more data volumes stored on one or more respective requested unmounted TDSMs is interrupted is generated by the host processor.

21. The method of claim 20, wherein the signal sent to the control unit to indicate that the request to process one or more data volumes stored on one or more respective requested unmounted TDSMs is interrupted is generated by the selection of an interrupt choice field presented on the operator display.

22. An automated storage library in communication with a host processor, having the ability to process one or more transient data storage mediums (TDSMs) stored outside of the storage library, comprising:

one or more storage medium drives;

a plurality of data storage mediums (DSMs) wherein each DSM has a machine readable label containing information related to the DSM;

a plurality of data storage bins, each bin for storing a data storage medium (DSM) therein;

a picker for transferring a volume between any drive of the one or more storage medium drives and any storage bin;

a control unit having electronic memory and being in communication with the host processor;

an operator display in communication with the control unit;

one or more transient data storage mediums (TDSMs) stored outside of the storage library, each TDSM having a data volume stored therein;

an input station for adding one or more DSMs to the storage library;

an information sensing device coupled with the input station for automatically reading the label on the one or more DSMs;

host processor request servicing means coupled to the control unit for servicing a host processor request;

the host processor request servicing means including means for processing one or more data volumes stored on one or more respective requested unmounted TDSMs by:

determining if the one or more requested unmounted TDSMs are positioned at the input station for being transferred by the picker;

disabling the information sensing device such that if a condition exists wherein a machine readable label is attached to the one or more requested unmounted TDSMs then the label is not automatically read;

in response to determining if the one or more requested unmounted TDSMs are positioned at the input station, commanding the picker to transfer a TDSM selected from the one or more TDSMs at the input station to a selected medium drive;

mounting the TDSM on the selected medium drive;

sending a signal to indicate that the mounting of the TDSM on the selected medium drive is completed;

processing the data volume stored on the TDSM to satisfy the host processor request; and commanding the picker to transfer the TDSM from the selected medium drive to the input station.

23. The automated storage library of claim 22, wherein the signal sent to indicate the mounting of the TDSM on the selected medium drive is completed is sent to an operator display.

24. The automated storage library of claim 22, wherein the signal sent to indicate the mounting of the TDSM on the selected medium drive is completed is sent to a host processor.

25. The automated storage library of claim 22, wherein the servicing means coupled to the control unit further comprises:

means for determining if there are any remaining TDSMs of the one or more requested unmounted TDSMs positioned at the input station having an unprocessed data volume; and the means for processing one or more data volumes stored on one or more respective requested unmounted TDSMs allowing continued processing of the one or more data volumes stored on one or more respective requested TDSMs until there are no more remaining TDSMs positioned at the input station having an unprocessed data volume, unless a signal is sent to the control unit to indicate that the request to process one or more data volumes stored on one or more respective unmounted TDSMs is interrupted.

26. The automated storage library of claim 25, wherein the signal sent to the control unit to indicate that the request to process one or more data volumes stored on one or more respective requested unmounted TDSMs is generated by the host processor.

27. The automated storage library of claim 26, wherein the signal sent to the control unit to indicate that the request to process one or more data volumes stored on one or more respective requested unmounted TDSMs is generated by the selection of an interrupt choice field presented on the operator display.

28. The automated storage library of claim 22, wherein the determining if the one or more requested unmounted TDSMs are positioned at the input station for transferring by the picker is preceded by sending a signal to the operator display to indicate that the one or more TDSMs are to be positioned at the input station.

29. The automated storage library of claim 28, wherein the sending of a signal to the operator display to indicate that the one or more TDSMs are to be positioned at the input station is preceded by the selection of a first displayed mode choice field on the operator display, the first displayed mode choice field indicating that the control unit will be place in an automatic mode to command the picker to transfer and mount TDSMs.

30. The automated storage library of claim 29, wherein upon the completion of the processing of the data volume stored on the TDSM, the operator display is presented with a signal indicating that the operator may select a second displayed mode choice field, the second displayed mode choice field designating that the automatic mode to command the picker to transfer and mount TDSMs is to be terminated.

31. The automated storage library of claim 30, wherein the servicing means coupled to the control unit further comprises:

means for commanding the automatic picker to remove any remaining TDSM from the selected medium drive and to return the remaining TDSM to the input station upon selection of the second display mode choice field designating that the automatic mode to command the picker to transfer and mount TDSMs is to be terminated.

32. The automated storage library of claim 25, wherein the continued processing until there are no more remaining TDSMs positioned at the input station having an unprocessed data volume is followed by sending a signal to the operator display to indicate that other TDSMs may be positioned at the input station to replace the one or more requested unmounted TDSMs storing a processed data volume.

33. The automated storage library of claim 22, wherein the selected medium drive corresponds to a device address sent to the control unit.

34. A library control device for servicing a host processor request to process one or more data volumes stored on one or more respective requested unmounted transient data storage mediums (TDSMs) in a storage library including one or more storage bins, each bin for storing a data storage medium (DSM) therein, the DSM having an attached readable label containing information related to the DSM, the storage library also including one or more storage medium drives and a robotic picker for mounting a DSM on a medium drive, the storage library having an input station for adding one or more DSMs to the storage library, the robotic picker having an information sensing device for automatically reading the machine readable label, the storage library further having an operator display, electronic memory coupled with the control unit, the control unit in communication with the operator display and the host processor, the library control device comprising:

electronic memory;

a control processor coupled with the electronic memory;

the control processor including a command module in communication with the robotic picker, the control processor further in communication with the operator display and the host processor;

a sensing device in communication with the control processor, the sensing device having a first capability of generating a TDSM mount signal in response to determining if TDSMs are positioned at the input station;

the command module capable of responding to the TDSM mount signal by issuing a first command to the picker to mount a TDSM selected from the one or more TDSMs at the input station on a selected medium drive, and by disabling the information sensing device such that if a condition exists wherein a machine readable label is attached to the one or more requested unmounted TDSMs then the label is not automatically read;

an operator display signal generator capable of generating a first signal to be displayed on the operator display indicating that the mounting of the TDSM on the selected medium drive is completed; and the command module having a first capability of responding to a signal that the host processing request has been satisfied by issuing a second command to the picker to transfer the TDSM from the selected medium drive to the input station.

35. The library control device of claim 34, and further comprising:

the sensing device having a second capability of determining if there are any remaining TDSMs of the one or more requested unmounted TDSMs positioned at the input station having an unprocessed data volume; and the command module having a second capability of issuing commands to the picker to transfer any remaining TDSMs positioned at the input station until there are no more remaining TDSMs positioned at the input station having an unprocessed data volume, unless a signal is sent to the control unit to indicate that the request to process one or more data volumes stored on one or more respective unmounted TDSMs is interrupted.

36. The library control device of claim 35, wherein the signal sent to the control unit to indicate that the request to process one or more data volumes stored on one or more respective requested unmounted TDSMs is interrupted is generated by the host processor.

37. The library control device of claim 36, wherein the signal sent to the control unit to indicate that the request to process one or more data volumes stored on one or more respective requested unmounted TDSMs is interrupted is generated by an interaction with the library control device.

38. The library control device of claim 34, wherein the selected medium drive corresponds to a device address sent to the control unit.

39. A library control device for servicing a host processor request to process one or more data volumes stored on one or more respective requested unmounted transient data storage mediums (TDSMs) in a storage library including one or more storage bins, each bin for storing a data storage medium (DSM) therein, the DSM having an attached readable label containing information related to the DSM, the storage library also including one or more storage medium drives and a robotic picker for mounting a DSM on a medium drive, the storage library having an input station for adding one or more DSMs to the storage library, the robotic picker having an information sensing device for automatically reading the machine readable label, the storage library further having an operator display, electronic memory coupled with the control unit, the control unit in communication with the operator display and the host processor, the library control device comprising:

electronic memory;

a control processor coupled with the electronic memory;

the control processor including a command module in communication with the robotic picker, the control processor further in communication with the operator display and the host processor;

a sensing device in communication with the control processor, the sensing device having a first capability of generating a TDSM mount signal in response to determining if TDSMs are positioned at the input station;

the command module capable of responding to the TDSM mount signal by issuing a first command to the picker to mount a TDSM selected from the one or more TDSMs at the input station on a selected medium drive, and by disabling the information sensing device such that if a condition exists wherein a machine readable label is attached to the one or more requested unmounted TDSMs then the label is not automatically read;

a host processor signal generator capable of generating a first signal to be received by the host processor indicating that the mounting of the TDSM on the selected medium drive is completed; and the command module having a first capability of responding to a signal that the host processing request has been satisfied by issuing a second command to the picker to transfer the TDSM from the selected medium drive to the input station.

40. The library control device of claim 39, and further comprising:

the sensing device having a second capability of determining if there are any remaining TDSMs of the one or more requested unmounted TDSMs positioned at the input station having an unprocessed data volume; and the command module having a second capability of issuing commands to the picker to transfer any remaining TDSMs positioned at the input station until there are no more remaining TDSMs positioned at the input station having an unprocessed data volume, unless a signal is sent to the control unit to indicate that the request to process one or more data volumes stored on one or more respective unmounted TDSMs is interrupted.

41. The library control device of claim 40, wherein the signal sent to the control unit to indicate that the request to process one or more data volumes stored on one or more respective requested unmounted TDSMs is interrupted is generated by the host processor.

42. The library control device of claim 41, wherein the signal sent to the control unit to indicate that the request to process one or more data volumes stored on one or more respective requested unmounted TDSMs is interrupted is generated by an interaction with the library control device.

43. The library control device of claim 35, wherein the selected medium drive corresponds to a device address sent to the control unit.

* * * * *